Oct. 31, 1950     P. D. MIZE     2,528,070
APPARATUS FOR APPLYING SOLID RESILIENT TIRES
CONTAINING A CENTRAL WIRE TO GROOVED WHEELS
Filed Feb. 18, 1946     6 Sheets-Sheet 1
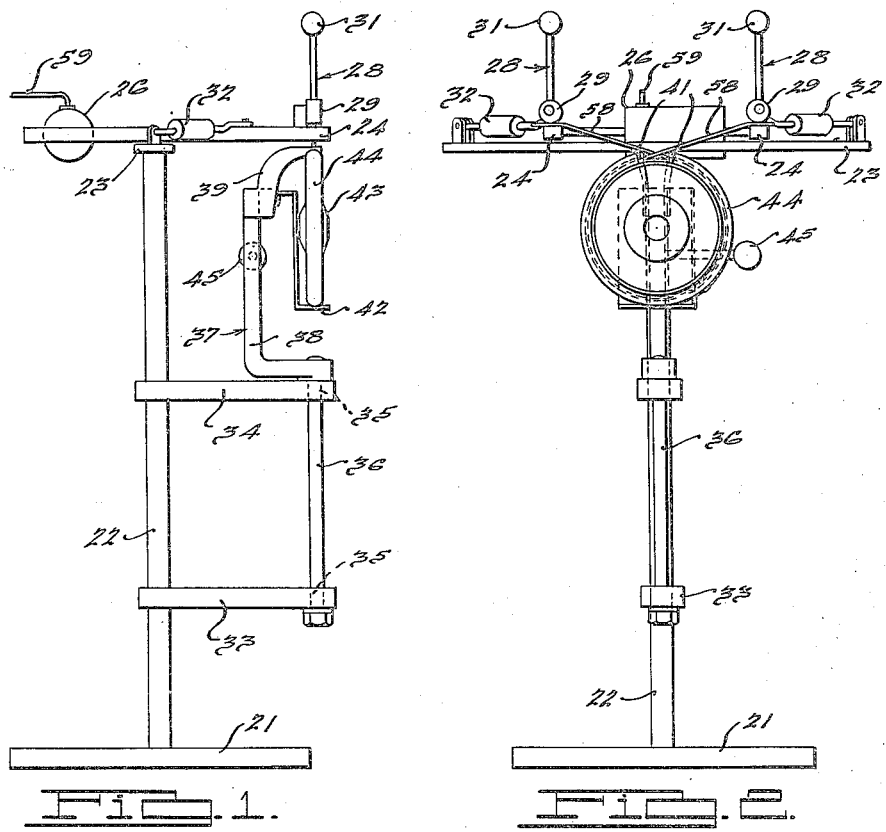
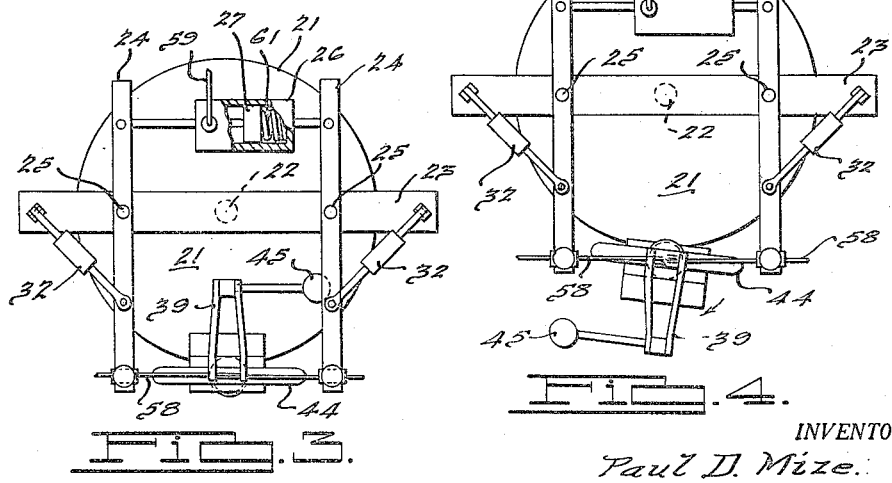
INVENTOR.
Paul D. Mize.
BY
Harness, Dickey & Pierce.
ATTORNEYS.

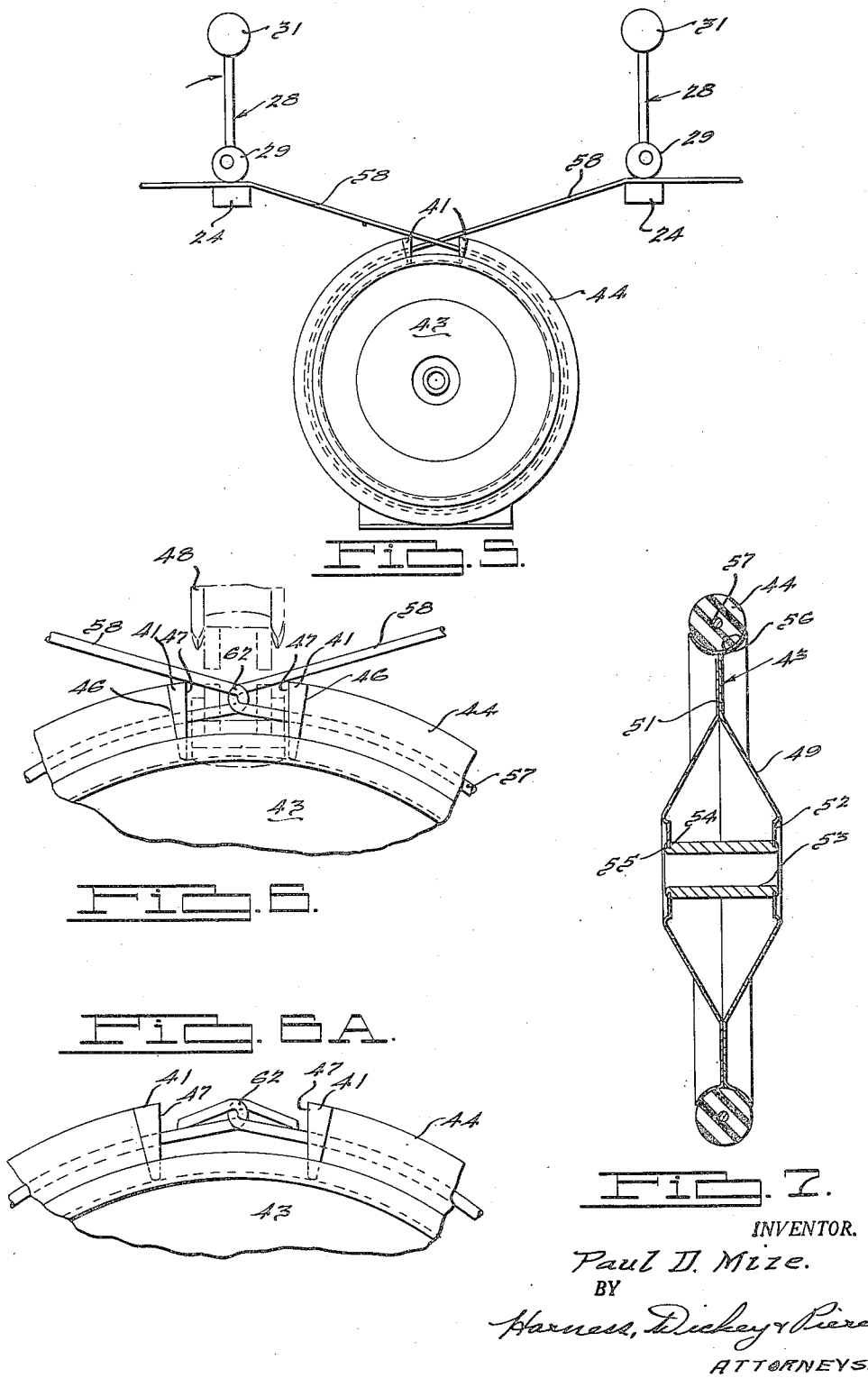

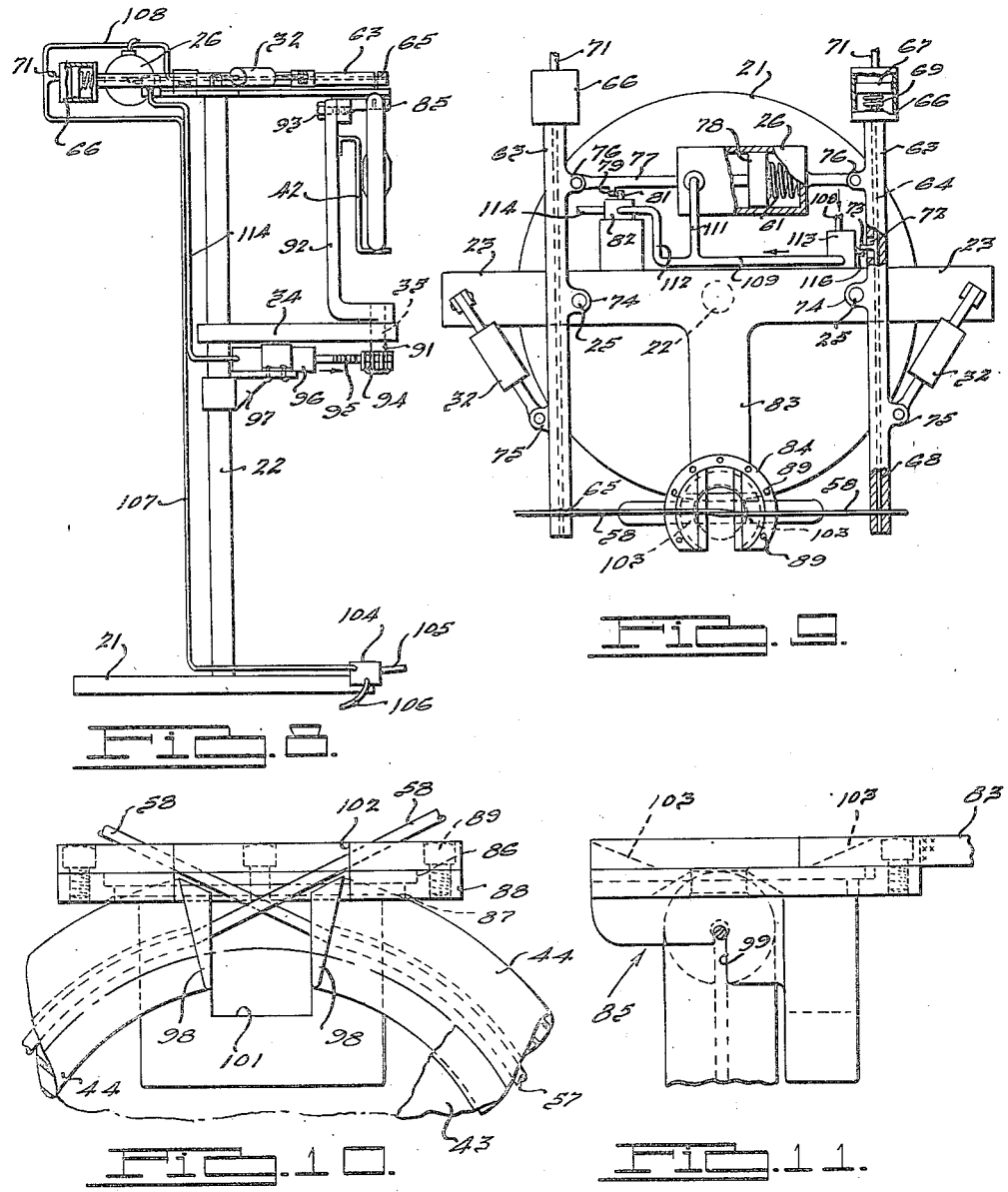

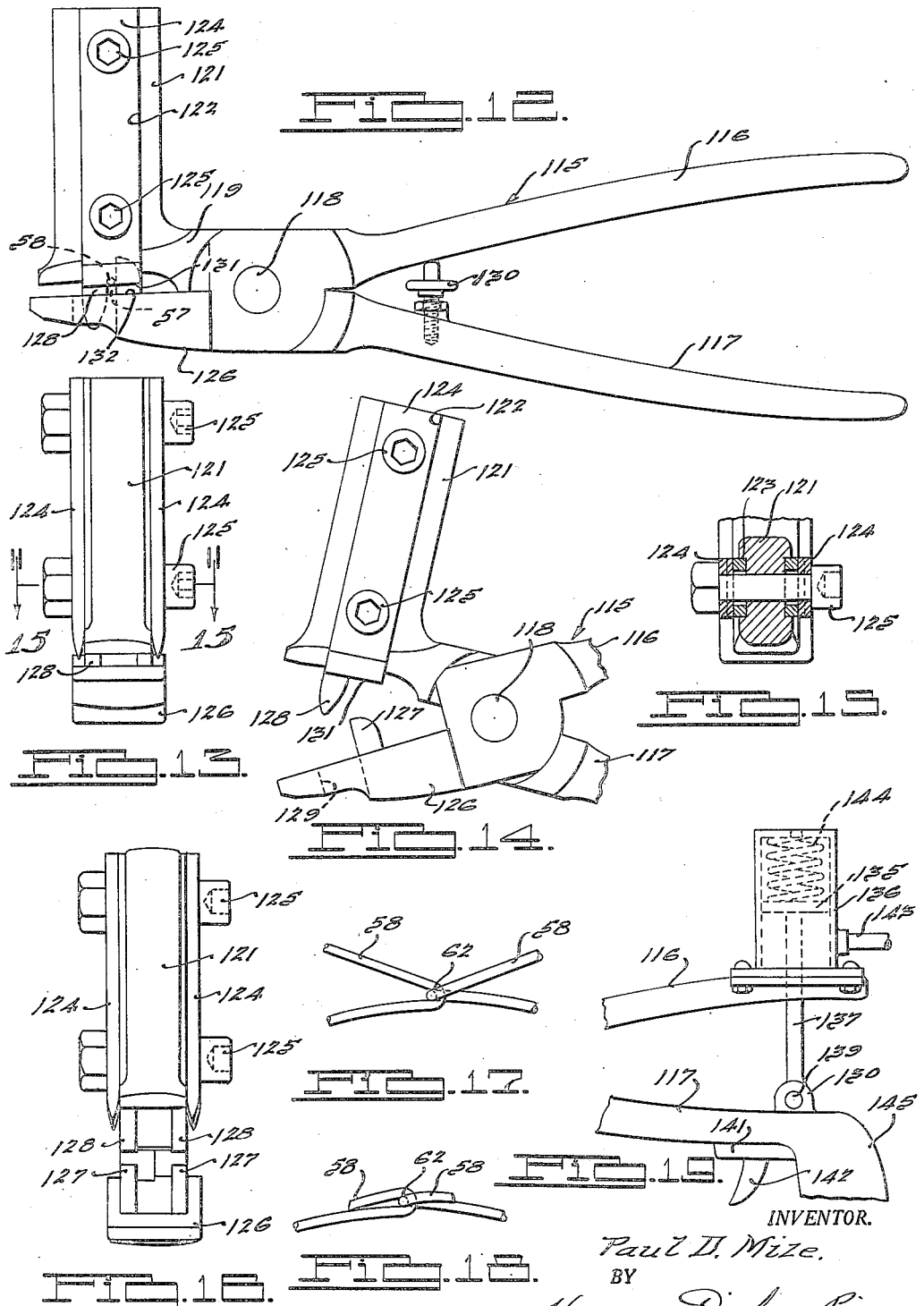

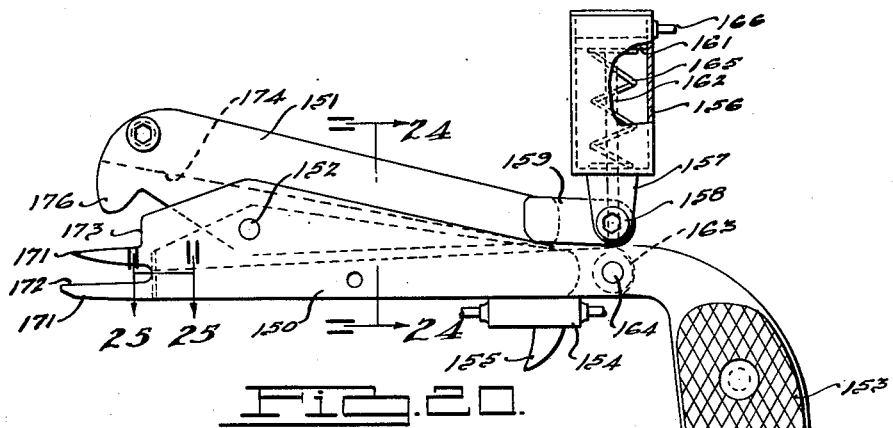
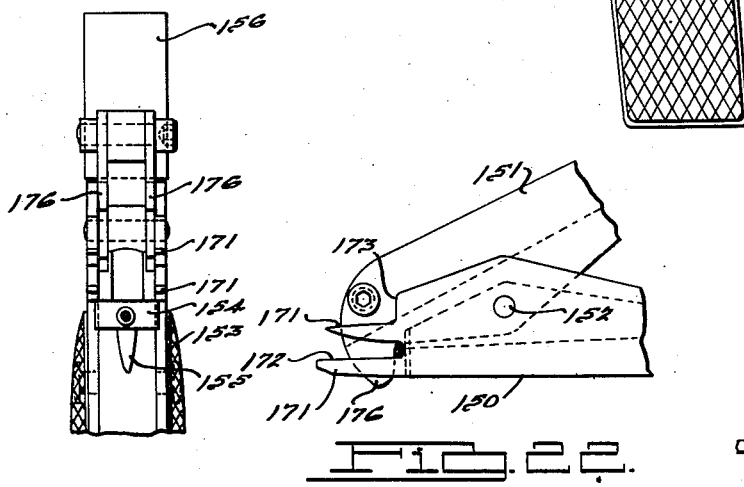
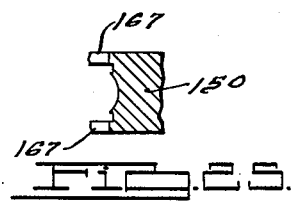
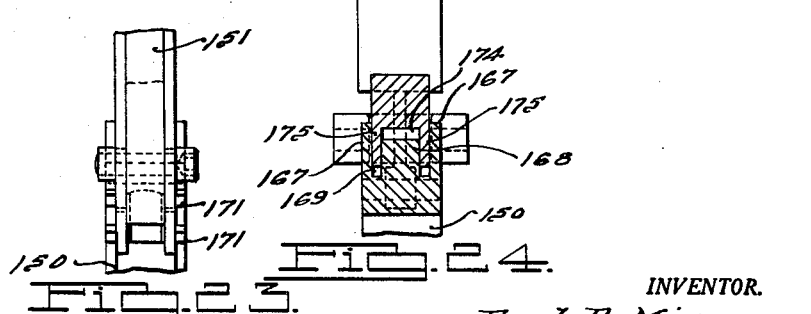

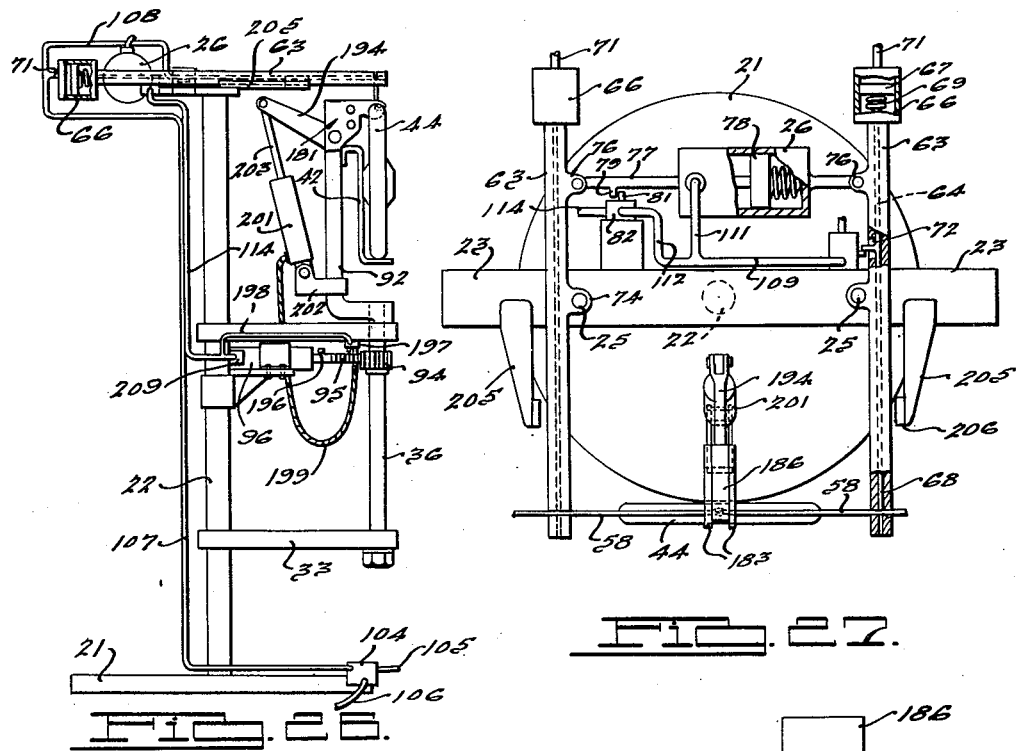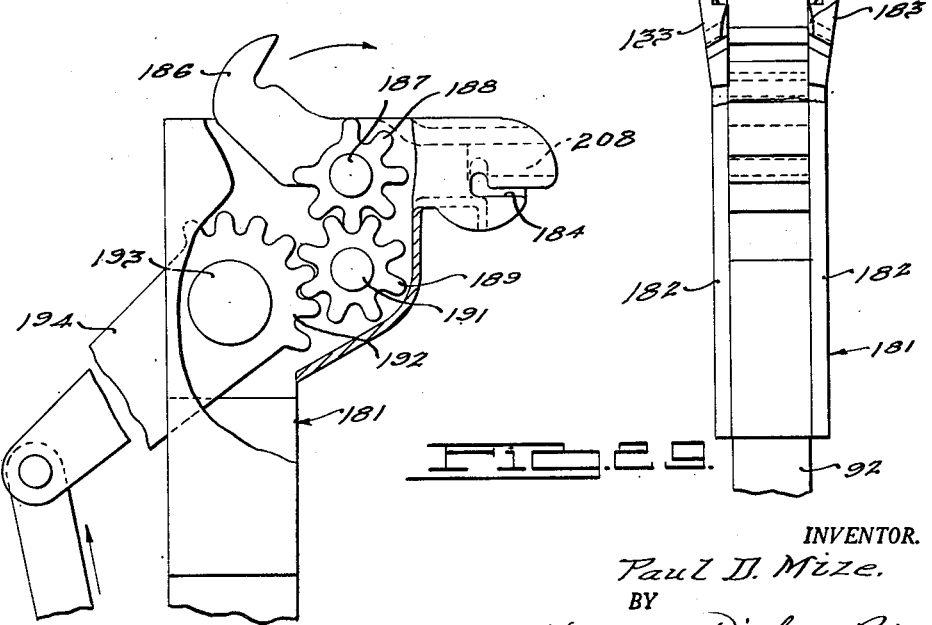

Patented Oct. 31, 1950

2,528,070

UNITED STATES PATENT OFFICE 2,528,070

APPARATUS FOR APPLYING SOLID RESILIENT TIRES CONTAINING A CENTRAL WIRE TO GROOVED WHEELS

Paul D. Mize, Detroit, Mich.

Application February 18, 1946, Serial No. 648,416

16 Claims. (Cl. 157—1.14)

1

This invention relates to tire applying devices for wheels, and particularly to a device for applying a solid rubber tire having a wire therethrough to a peripheral groove in the edge of a wheel which tensions the wire disposed as its ends are looped and severed.

While various devices have been employed heretofore in the art for applying solid rubber tires having a centrally disposed wire therethrough to the peripheral groove of a wheel, the device of the present invention considerably simplifies the operation and rigidly secures the tire in the groove.

The device embodies a standard having on the upper portion thereof a pair of pivoted arms which are moved from angular to substantially parallel position by manual or power means. Jaws on the ends of the arms engage the projecting ends of the wire after the tire has been placed in the peripheral groove of the wheel and supported on a bracket which is rotatable beyond 180°. After the wires are secured in the clamping jaws, the manual or power means operates the levers to move the jaws away from each other to thereby apply a predetermined tension to the wire and for drawing the tire into the groove. A pair of projecting fingers spaces the ends of the tire, from which space the wires project. The bracket and tire are thereafter rotated to form a loop between the ends of the wire, after which the projecting ends are severed. Upon the removal of the tire, the tension on the rubber causes the ends to move over the loops into engaged position.

Power means in the nature of cylinders may be employed for producing an automatic cycle of operation, for securing the ends of the wire, for operating the end clamping levers for tensioning the wires, for rotating the bracket for forming loops in the wires and after the wires are severed to reverse the operation in preparation for the following cycle.

A wire cutting device is employed having jaws which align the wires of each looped portion on top of each other and thereafter cut the top wire and close the loop to reduce the amount of material to be covered by the ends of the tire. The cutting jaws may be manually operated or may be power operated, employing a cylinder and valve which is air or otherwise operated. The wire cutting device may also be constructed to shear the ends of the wire between two blade portions and thereafter fold the ends to reduce the loop.

Accordingly, the main objects of the invention

2 are: to provide a device for spacing the ends of a solid rubber tire as the wire therethrough is drawn taut; to revolve the tire and wheel through slightly more than 180° for forming a loop in the crossed ends of the wire which are drawn taut theretofore and thereafter severed adjacent to the loop; to provide a device for tensioning the crossed ends of a wire in the center of a solid rubber tire which is disposed in the peripheral groove in a wheel to form a loop at the crossed portion when the wheel is revolved through slightly more than 180° which is covered by the ends of the tire when the ends of the wire are severed; to provide a tool having jaws projectable over the loop formed in the crossed ends of the wire for aligning the ends above the wire in the groove of the wheel and for cutting through the ends without substantially damaging the wire in the groove; to provide a tool having jaws which shear the ends of the wire adjacent to the loop and for thereafter completing the loop; and, in general, to provide a device for applying solid rubber tires to the grooves in wheels which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in side elevation of a tire applying device embodying features of this invention;

Fig. 2 is an end view of the device illustrated in Fig. 1;

Fig. 3 is a plan view of the device illustrated in Figs. 1 and 2 before the wheel and tire are revolved to form a loop;

Fig. 4 is a view of the structure illustrated in Fig. 3 after the tire has been revolved slightly beyond 180° to form a loop;

Fig. 5 is an enlarged broken view of the structure illustrated in Fig. 2, showing the wires in crossed tensioned relation before the wheel and tire are revolved to form loops in the wire;

Fig. 6 is an enlarged broken view of the structure illustrated in Fig. 5 after the wheel and tire have been revolved to form the loop and with the jaws of the cutting tool illustrated in position to sever the projecting ends of the wire;

Fig. 6A is a view of the structure illustrated in Fig. 6 after the cutting tool has been operated to sever the wire ends and to compress the loop;

Fig. 7 is a sectional view of the wheel after the tire has been applied to the peripheral groove thereof;

Fig. 8 is a view in side elevation of a machine similar to that illustrated in Fig. 1, showing a further form which the invention may assume;

Fig. 9 is an enlarged plan view of the structure illustrated in Fig. 8;

Fig. 10 is an enlarged broken view of the structure illustrated in Fig. 8, as viewed from the end thereof;

Fig. 11 is an end view of the structure illustrated in Fig. 10;

Fig. 12 is a view in side elevation of the tool, the jaws of which are illustrated in Fig. 6, for centering the ends of the wire after the loop was formed therein;

Fig. 13 is an end view of the structure illustrated in Fig. 12;

Fig. 14 is a broken view of the structure illustrated in Fig. 12, with the jaws illustrated in open position;

Fig. 15 is a sectional view of the structure illustrated in Fig. 13, taken on the line 15—15 thereof;

Fig. 16 is an end view of the structure illustrated in Fig. 14;

Fig. 17 is a broken view of the wire in the center of the tire after the ends thereof have been twisted to form the loop therein;

Fig. 18 is a view of the structure illustrated in Fig. 17, after the projecting ends of the wire have been severed and the loop collapsed;

Fig. 19 is a broken view of the structure illustrated in Fig. 12, with power applying means provided thereon;

Fig. 20 is a view of a loop compressing and severing device, similar to that illustrated in Fig. 12, with the jaws in open position showing a further form which it may assume;

Fig. 21 is a front view in elevation of the structure illustrated in Fig. 20;

Fig. 22 is a broken side view of the structure illustrated in Fig. 20, with the jaws of the device shown in closed position;

Fig. 23 is a front view in elevation of the structure illustrated in Fig. 22;

Fig. 24 is a sectional view of the structure illustrated in Fig. 20, taken on the line 24—24 thereof;

Fig. 25 is a sectional view of the structure illustrated in Fig. 20, taken on the line 25—25 thereof;

Fig. 26 is a view of the machine illustrated in Fig. 8, with the cutting tool applied thereto;

Fig. 27 is a plan view of the machine illustrated in Fig. 26;

Fig. 28 is an enlarged broken view of the cutting tool illustrated on the machine of Fig. 26, and Fig. 29 is an end view of the cutting tool illustrated in Fig. 28, as viewed from the front end thereof.

In Figs. 1 to 8, a device for applying rubber tires to the peripheral groove of wheels is illustrated, embodying a base 21 having a standard 22 projecting upwardly therefrom, upon which a cross member 23 is secured. A pair of levers 24 is pivoted at 25 on the cross members 23 interconnected at the rear ends by a cylinder 26 and a piston rod 27. It is to be understood that a manually operated lead screw may be employed in place of the cylinder and piston for interconnecting and moving said levers.

The forward ends of the levers 24 are provided with clamping elements 28 which in Figs. 1 to 5 are illustrated as cams 29 operated by handles 31 for securing the ends of the wire against the top surface of the levers 24. A pair of cylinders 32 interconnects the forward end of the levers 24 with the ends of the cross member 23. The cylinders 32 function as shock absorbers for preventing the rapid retraction of the levers when the ends of the wire are severed so that should one end of the wire be severed ahead of the other, tension will still be applied on the unsevered end.

A pair of arms 33 and 34 is supported on and projects forwardly of the standard 22, having bearing apertures 35 which are aligned with each other and with the central line between the forward end of the levers 24. A shaft 36 is mounted for rotation in the apertures 35 and supports a yoke 37 for revolution about the axis of the shaft. The yoke 37 embodies an L-shaped lower element 38 upon the upper portion of which a bifurcated element 39 is secured having the spaced end portions 41 disposed centrally between the levers 24 for engaging the ends of the tire and retaining them in spaced relation to provide a working area therebetween. A bracket 42 extends forwardly of the yoke 37 for receiving a wheel 43 upon which a tire 44 is to be secured. A handle 45 is attached to the yoke 37 by which it may be manually revolved about the axis of the shaft 36.

It will be noted in Figs. 5, 6, and 7 that the end portions 41 of the bifurcated element 39 has outer surfaces 46 which are radially disposed so as to have the ends of the tire 44 disposed in radial planes when tension is applied to the crossed ends of the wire. The inner faces 47 are disposed in parallel relation spaced apart an amount sufficient to permit the entrance of the severing jaws of a tool 48 therebetween.

In Fig. 7 the wheel 43 is illustrated in section as comprising two like stampings 49 which are disposed in opposite relation to each other and secured together at the mating webs 51 by welding or other means. A hub portion 52 engages a sleeve bearing 53 before the welding operation, the sleeve being retained in position by a shoulder 54 with which the metal at the central opening of the stampings engages and over which the projecting end portions 55 are thereafter flanged. An arcuate peripheral recess 56 is formed on the outer edge of the wheel by the arcuate portion formed on the peripheral edge of the stampings. It is to be understood that the tire applying device is not limited for applying tires to this particular type of wheel but that any wheel having a peripheral recess may have the tire applied thereto.

A length of solid rubber of cylindrical shape having a wire 57 extending through the center thereof is applied to the peripheral recess 56 and the wheel is then disposed upon the bracket 42 with the projecting ends 58 of the wire crossed in the space between the end portions 41 of the element 39 so that when the ends 58 are tensioned the ends of the tire 44 abut the faces 46 of the portions 41. The ends 58 of the wire are clamped to the forward ends of the lever 24 by the clamping elements 28 through the manipulation of the handles 31 and the operation of the cams 29. A lead screw may then be operated to spread the forward ends of the lever 24 apart or a cylinder, such as cylinder 26 herein illustrated, may be supplied with a fluid, such as air, through the conduit 59 to spread the forward ends of the lever 24 apart against the bias of a spring 61 in the opposite end of the cylinder.

The spreading apart of the forward ends of the lever 24 tensions the wire 57, after which the yoke 37 is rotated approximately 185° through the manipulation of the handle 45 to form a loop 62 in the crossed ends 58 of the wire, as illustrated in Fig. 6. The tool 48 is then inserted in the space between the faces 47 of the end portions 41 and the wire ends 58 are severed from the loops which are formed as small as possible by the tool during the cutting operation. The severed loop 62 is illustrated in Fig. 6A and this loop is covered by the ends of the tire 44 when the wheel is removed from the projecting ends 41 of the element 39 as the tension in the rubber forces the ends to move into abutted relation thereover, or when a device is employed for forcing the ends together.

Referring to Figs. 8, 9, 10 and 11, an improved form of device is illustrated, that wherein levers 63 are similar to the levers 24 with the exception that they are of tubular construction having a central aperture 64. Slots 65 are provided near the forward ends of the levers 63 communicating with the central aperture 64. Cylinders 66 are mounted on the ends of the levers 63 having a piston 67 therein mounted on an end of a rod 68 which extends through the greatest portion of the aperture 64 in the levers. A spring 69 forwardly of piston 67 is employed for retracting the piston and the rod after the fluid conducted to the cylinder through the conduit 71 has been returned to tank, if a liquid, or to the atmosphere, if air. A slot 72 is provided through the wall of the lever 63 and a pin 73 is secured to the rod for operation in a slot 72 through the side wall when the piston is moved in the cylinder.

The levers 63 have bosses 74 projecting from one side thereof by which they are pivoted at 25 to the cross member 23. Bosses 75 are also provided on the levers 63 to which one end of the shock absorbers 32 is secured. Additional bosses 76 near the rear portion of the levers provide securing means to which the cylinder 26 and rod 77 on a piston 78 are attached. The rod 77 has a projection 79 engageable with a trip lever 81 of a valve 82.

The cross member 23 is provided with a forwardly projecting portion 83 which carries a slotted plate 84 on its forward end. The center of the plate 84 is aligned with the aperture 35 in the projecting arm 34 of the standard 22. A rotatable element 85 is provided with a cylindrical flange 86 which is engaged by a shoulder 87 in a plate 88 which is secured to the plate 84 by a plurality of screws 89. The rotatable element 85 is freely rotatable between the plates 84 and 88 and may be employed alone when the device is to be manually operated.

When automatic manipulation of the device is desired, a shaft 91 is mounted in the aperture 35 to which a yoke 92 is secured having the upper end thereof attached to the rotatable element 85 by screws 93. The bracket 42 is carried by the yoke 92 for supporting the wheel and tire. On the lower end of the shaft 91, a pinion 94 is secured in position to be operated by a rack 95 on a piston within a cylinder 96 supported by a bracket 97 on the standard 22.

The rotatable element 85 has a pair of spaced tire engaging members 98, similar to the end portions 41 of the element 39 on the device illustrated in Figs. 1 to 5 inclusive. Slots 99 are provided through the lower portion of the members 98 for receiving the wire 57 disposed within the tire 44. A slot 101 extends through the element 85 between the members 98 and a slot 102 is provided through the plates 84 and 88 aligned with the slot 101. The top portion of the plate 84 has sloping recesses 103 provided therein in which the ends 58 of the wire are disposed when tensioned by the levers 63.

A valve 104 is secured to the base 21 having a foot-operated lever 105 projecting forwardly thereof. A supply line 106 for a fluid, preferably air, is connected to the valve 104 from which the air is conducted through a conduit 107 to the cylinders 66 and through a conduit 108 to a valve 113. Fluid from the valve is conducted by the conduit 109 to the conduit 111 which is connected to one end of the cylinder 26. Conduit 112 connects the conduit 109 to the valve 82 from which a conduit 114 conducts the air to the rear end of the cylinder 96.

In operation, the wheel and tire are mounted on the bracket 42 and the ends of the tire 44 are drawn against the outer faces of the members 98 as the ends 58 of the wire 57 are disposed in the notches 65 in communication with the central aperture 64 of the levers 63. The foot-operated lever 105 is then depressed to open the valve 104, admitting air from the supply conduit 106, to the conduit 107, to the conduits 71 and into the cylinders 66 for advancing the pistons 67 against the springs 69. The forward movement of the pistons 67 advances the rods 68 to engage the ends of the wires 58 to securely clamp them to the end portions of the levers 63. The advancement of the rods 68 causes the projecting element 73 on one of the rods to operate the lever 116 of the valve 113 admitting air from the conduits 107 and 108 to the conduits 109 and 111 and the cylinder 26. The air admitted to the cylinder 26 advances the piston 78 therein and separates the forward ends of the levers 63, thereby tensioning the wire 57 in the tire 44. The movement of the piston rod 77 causes the projecting element 79 thereof to operate the lever 81 of the valve 82 to permit air to pass from the conduit 112 out of the conduit 114 into the end of the cylinder 96. This produces the forward movement of the rack 95 to rotate the pinion 94 and therefore the yoke 92, the element 85, the wheel 43 and tire 44, through slightly more than 180°. The rotation of the element 85 and the tire and wheel forms the loop 62 therein while the ends 58 of the wire are held stationary. The rotation of the element 85 beyond 180° disposes the wires of the loop above each other so that when the loop completing and severing jaws are inserted in the slot 101 the ends 58 of the wire extending from the loop may be severed and the loop compressed.

Upon the removal of the foot from the lever 105, the valve 104 is closed to shut off the supply of fluid from the conductor 106 and the conduit 107 is connected to the atmosphere. This releases the pressure on the various cylinders which are retracted by the springs disposed therein forwardly of the piston. The springs 69 ahead of the piston 67 are weaker than the spring 61 in the cylinder 26 which is of substantially less strength than the spring in the cylinder 96. This permits the pressure to be first relieved in the cylinder 96, thereafter in the cylinder 26, and finally in the cylinders 66. By such an arrangement the valves 82 and 113 remain open until the air is relieved from the cylinders controlled thereby. Upon the retraction of the piston 67 and rod 68, the ends 58 of the wire 57 drop from slots 65 in the ends of the levers 63 and the device is then in a position to again operate to attach a tire to a wheel.

Referring to Figs. 12 to 19 inclusive, the loop completing and end severing device 115 is illustrated. The device is plier-like in form having crossed handles 116 and 117 pivoted at 118. The lower handle 117 has the upper jaw 119 on its forward end provided with an upwardly projecting boss 121. The sides of the boss are slotted at 122 for receiving guiding blades 123. Upon the guiding blades a pair of cutting blades 124 is mounted, all of which are secured together by a pair of through bolts 125. The guiding blades and cutting jaws may have slightly elongated slots through which the bolts 125 project so that the blades may have some adjustment longitudinally of the boss 121.

The upper handle 116 has a lower jaw 126 disposed forwardly of the pivot 118 containing spaced upwardly projected guiding blades 127 which are in alignment with the blades 123 on the boss 121. The blades 123 have downwardly projecting guiding portions 128 which are disposed forwardly of the guiding blades 127 on the lower jaw 126 when the jaws are disposed in engaged position, as illustrated in Fig. 12, providing a space therebetween equal to the thickness of the wire 57. A pair of recesses 129 is disposed forwardly of the guiding blades 127 of the jaw 126 for receiving the projecting portions 128 of the blades 123.

The cutting blades 124 are provided with cutting edges 131 which are so adjusted on the boss 121 as to be spaced from the cutting anvil 132 an amount equal to the thickness of the wire 57 so as to cut the top wire upon the bottom wire and anvil without cutting the bottom wire. Thus, after the wires have been twisted into the loops 62, as illustrated in Fig. 17, the device 115 is then moved to have the guiding blades 127 engage the wire portions forming the loop. When the handles 116 and 117 are moved together, the portions of the wire forming the loop will be squeezed down upon each other between the blades 127 and the projecting guiding portions 128 with the top end portions 58 aligned with the bottom portions which rest upon the anvil 132. The further movement of the handles 116 and 117 together causes the cutting edge 131 to cut through the top wire portion 58 to sever the portions without cutting into the wire 57. An adjustable stop element 130 may be provided between the handles for limiting the minimum distance they are spaced apart to regulate the depth of cut of the blades.

It will be noted from Fig. 18 that both ends of the loop are pressed down upon the wire holding the rubber tire in position to compress the loop so that the ends of the tire will move over the loop when removed from the spaced end portions 41 which retained them separated.

In Fig. 19 the handles 116 and 117 are illustrated as being power-operated by the actuation of a piston 135 operating in a cylinder 136 which is mounted upon the handle 116 through which a piston rod 137 projects. The piston rod is pivoted to a boss 138 on the handle 117 by a pin 139. A valve 141 is carried by the handle 117 operated by a finger-actuated lever 142 to control the flow of air to and from a conduit 143 connected to the cylinder 136. A spring 144 on the forward end of the piston 135 retracts the piston to open the jaws 119 and 126 when the air in conduit 143 is connected to the atmosphere. A handle grip 145 may be provided on the end of the handle 117 by which the loop forming and wire severing device may be grasped and manipulated.

Referring to Figs. 20 to 25, another form of wire severing and loop completing device is illustrated, embodying a frame element 150 having a cutting and compressing element 151 secured thereto by a pivot 152. The rear end of the frame element 150 is provided with a handle portion 153 adjacent to which a control valve 154 is secured having a valve operating trigger 155. A cylinder 156 is provided with a pair of spaced ears 157 which are secured by a pair of screws 158 to spaced projecting bosses 159 on the end of the element 151. A piston 161 is mounted in the cylinder 156 having a rod 162 extending downwardly therefrom between the spaced bosses 159 and having an eye 163 on the end which is secured by a pivot 164 to the frame element 150. A spring 165 is disposed within the cylinder about the rod 162 for moving the piston to the closed end of the cylinder. A conduit 166 connects the source of fluid passing through the valve 154 to the closed end of the cylinder above the piston for moving the piston downwardly and tilting the elements 151 on the frame element 150.

The frame 150 may be built up from stampings or may be machined from solid stock to provide side plates 167 spaced from a central projection 168 by slots 169. The plates 167 extend forwardly of the projection 168 providing spaced jaws 171 having a slot 172 therein for receiving the lower wire of the loop. The plates extend above the jaws to form shoulders 173 for receiving and holding the ends 58 of the wire while being sheared.

The cutting and compressing element 151 has a central slot 174 forming two side plates 175 which extend into the slots 169 of the frame element 150 to abut against the plates 167 in shearing relation with the jaws 171. The portion of the plates 175 above the jaws 171 is provided with projections 176 which engage the wire ends 58 and draw them along the top of the jaws 171 into abutment with the shoulders 173. Thereafter the projections 176 shear the ends 58 of the wire upon the continued movement of the element 151, which continued movement carries the ends 58 of the loop down into engagement with the lower wire portion of the loop when the device is in the position illustrated in Fig. 22 at the end of its movement.

After the loop has been completed, the release of the trigger disconnects the source of fluid from the cylinder 156 and permits the spring 165 to return the forward ends of the device to open position.

Referring to Figs. 26 to 29 inclusive, a further form of the invention is illustrated, that wherein the cutting tool is carried by the machine and is operated in sequence with the other elements thereof. The machine, as illustrated in Fig. 26, is similar to the machine illustrated in Fig. 8, with the exception that the yoke 92 carries a cutting tool 181 on the upper end above the wheel supporting bracket 42. The cutting tool, as illustrated more specifically in Figs. 28 and 29, embodies a pair of side plates 182 secured to the upper end of the yoke 92, as illustrated more specifically in Fig. 29. The upper ends of the plates are provided with forwardly projecting tire engaging elements 183 having rearwardly and angularly projecting slots 184 in which the wires in the tire are inserted when mounting a wheel on the bracket 42. Each element 183 is provided with a cutting shoulder 185 across which the free ends 58 of the wire are drawn and positioned after the wheel has been revolved through 180° to form a loop 62 therein, as illustrated in Figs. 17 and 18.

A wire cutting and deflecting arm 186 is secured between the plates 182 on a shaft 187. The portion of arm about the pivot is formed into a gear segment 188. The gear segment has the teeth thereof in engagement with the teeth of a pinion 189 mounted on a shaft 191, which pinion has its teeth also in mesh with the teeth of a gear segment 192. The segment 192 is mounted on a shaft 193 and is provided with an operating arm 194 which, when moved upwardly, causes the cutting and deflecting arm 186 to move clockwise about the shaft 187 and pass between the projecting tire engaging elements 183 to first cut the wires 58 on the shoulders 185 and thereafter to deflect the ends thereof downwardly against the wire forming the lower portion of the loop 62. When the operating arm 194 is moved downwardly, the cutting and deflecting arm 186 is moved counterclockwise from the position between the elements 183 to the open position, as illustrated in Fig. 28.

When the rack 95 moves forwardly to revolve the yoke 92 through substantially 180°, a projecting finger 196 carried thereby operates a valve 197 to conduct the fluid from the conduit 114, through a conduit 198, to a flexible conduit 199 and a cylinder 201. The cylinder is pivoted on an arm 202 which is secured to the yoke 92. A piston is mounted in the cylinder and carries a piston rod 203 which is attached to the end of the operating arm 194. The fluid is directed to the lower end of the cylinder below the piston and a spring is provided on the upper side of the piston for returning it to the bottom portion of the cylinder after the fluid is conducted therefrom. The sequence of operation of the machine is the same as that described hereinabove for the machine illustrated in Figs. 8 and 9, with the exception that after the yoke 92 has been revolved through substantially 180°, the operating arm 194 is actuated by the piston in the cylinder 201 for operating the cutting and deflecting arm 186 to sever the wires 58 and deflect the ends to complete the automatic cycle of applying the tire to the wheel.

It is only necessary for the operator to set the wheel, with the tire loosely applied thereto, on the bracket 42, insert the ends 58 of the wire in the slots 184, attach the wires to the arms 68 and operate the foot pedal 105 of the main valve 104. Thereafter the ends 58 of the wire are secured to the ends of the arms 63. The arms are then spread apart to stretch the wire and draw the ends of the rubber tires against the outer faces of the projecting elements 183, after which the rack 95 is advanced to rotate the yoke 92 to form the loop, after which the cutting and deflecting arm 186 is actuated to cut the wire and deflect the ends to complete the loop. The springs in the various cylinders, as pointed out hereinabove, are selected of such strength as to permit the reversal of the flow of fluid from the cylinder 201 which retracts the arm 194, then from the cylinder 96 to retract the rack 95, then from the cylinder 26 to move the forward end of the arms 63 toward each other, after which the clamping rods 64 within the arms are retracted so that the severed ends 58 of the wire are released therefrom and the device is again ready for operation.

It will be noted in Figs. 26 and 27 that in place of the snubbing cylinders 32, arms 205 are mounted on the cross member 23 at the top of the machine, having resilient pads 206 on the ends in a position to engage the arms 63 when the wires are cut and the arms tend to move outwardly from each other. The pads are in a position to engage the arms and stop the movement. It was found by the use of the cutting and deflecting arm 186 that both of the wires are cut simultaneously and that the arms are released from the tension applied to the wires at the same instant. It is no longer necessary, therefore, to apply a tension to one of the arms when the other has been released prior thereto.

It will be noted in Figs. 28 and 29 that recesses 208 are formed in the inner faces of the tire engaging elements 183 to permit the severed ends of the wires to be deflected downwardly by the arm 186 without binding on the faces. The center about which the wires are deflected is below their severed ends so that the ends would travel in an arc outwardly and would engage the inner faces of the elements 183 if these faces were not provided with the recesses 208.

It will be noted in Fig. 26 that a time delay valve 209 is disposed in circuit 114 adjacent to the cylinder 96 for producing a delay in the delivery of the fluid to the cylinder and the rotation of the shaft 36 to form the loop in the wire. This delay was found to be desirable to permit the rubber of the tire to set on the rim of the wheel and adjust itself on the wire after the wire is tensioned. The time delay valve 209 is of conventional form, having a piston and a controlled orifice delaying the opening of the passageway from the conduit 114 to the cylinder, and is not shown in detail. The valve 209 may be so constructed as to control the speed of operation of the cylinder 96 so that the movement is not too rapid. It is to be understood that the valve is provided with a by-pass orifice permitting the unrestricted flow of fluid to tank after the tire applying operation is completed.

What is claimed is:

1. A device for applying a tire to the peripheral groove in a wheel, said tire having a central wire with ends extending therefrom including, in combination, a support, a pair of levers on said support, means for moving one end of said levers apart, clamping means on said ends of the levers, means for supporting the ends of the tire in spaced relation when the ends of the wire projecting therefrom are disposed in crossed relation and secured by said clamping means which are moved apart thereafter by said moving means to apply a tension to the wire, and means for supporting said spacing means and the wheel and tire for revolution about a line through the crossed part of the wire to form a loop therein.

2. In a device for applying tires having a wire therethrough to the peripheral groove of a wheel including, in combination, a standard, a cross member on said standard, a pair of spaced levers pivoted on the cross member, means for operating the levers for separating the forwardly extending ends of said levers, clamping means on the forward ends of the levers for clamping the ends of the wire projecting from the ends of the tire in crossed relation thereon, a member having a pair of spaced elements for retaining the ends of the tire spaced apart, and means for revolving said wheel, tire and member approximately 180° to form a loop in the wire at the point of crossing.

3. In a device for applying tires having a wire therethrough to the peripheral groove of a wheel including, in combination, a standard, a cross member on said standard, a pair of spaced levers pivoted on the cross member, means for operating the levers for separating the forwardly extending ends of said levers, clamping means on the forward ends of the levers for clamping the ends of the wire projecting from the ends of the tire in crossed relation thereon, a member having a pair of spaced elements for retaining the ends of the tire spaced apart, means for revolving said wheel, tire and member approximately 180° to form a loop in the wire at the point of crossing, and a shock absorber secured to the forward end of each of said levers and to the ends of said cross member.

4. In a device for applying tires having a wire therethrough to the peripheral groove of a wheel including, in combination, a standard, a cross member on said standard, a pair of spaced levers pivoted on the cross member, means for operating the levers for separating the forwardly extending ends of said levers, clamping means on the forward ends of the levers for clamping the ends of the wire projecting from the ends of the tire in crossed relation thereon, a member having a pair of spaced elements for retaining the ends of the tire spaced apart, means for revolving said wheel, tire and member approximately 180° to form a loop in the wire at the point of crossing, a loop completing and end cutting element supported adjacent to the space between said spaced elements, and means on said machine for actuating said cutting element.

5. In a tire applying device for a wheel comprising a base, a standard having thereon a supporting element, a pair of spaced levers pivotally mounted on said supporting element, wire clamping means on the forward ends of said levers, means for manipulating said levers to have the forward ends thereof move toward and away from each other, a pair of projecting arms extending from said standard having bearing apertures therein aligned with said clamping means and disposed medially thereof, a shaft disposed in said bearing apertures, and a yoke supported by said shaft having spaced projecting end portions disposed in position to engage the ends of the tire which are retained in spaced relation when the ends of the wire are clamped on said levers in crossed relation and the forward ends of the levers are moved apart to apply a tension to the wire and tire, said shaft and yoke being rotatable substantially 180° to form a loop in said wire at their point of crossing on the center line of said shaft.

6. In a tire applying device for a wheel comprising a base, a standard having thereon a supporting element, a pair of spaced levers pivotally mounted on said supporting element, wire clamping means on the forward ends of said levers, means for manipulating said levers to have the forward ends thereof move toward and away from each other, a pair of projecting arms extending from said standard having bearing apertures therein aligned with said clamping means and disposed medially thereof, a shaft disposed in said bearing apertures, a yoke supported by said shaft having spaced projecting end portions disposed in position to engage the ends of the tire which are retained in spaced relation when the ends of the wire are clamped on said levers in crossed relation and the forward ends of the levers are moved apart to apply a tension to the wire and tire, said shaft and yoke being rotatable substantially 180° to form a loop in said wire at their point of crossing on the center line of said shaft, and means for revolving said yoke and shaft.

7. In a device for applying a solid tire containing a central wire to the peripheral groove of a wheel which comprises a standard having a top supporting element, a pair of tubular levers pivoted on said element, cylinders secured to the rear end of said tubular levers, a piston in each of said cylinders, a rod extending from said pistons through the hollow interior of said levers to the forward end adjacent to a notch provided therein in which the ends of the wire in the tire may be disposed and clamped when the pistons are moved forwardly in the cylinders, a rotatable element secured to said supporting element having a pair of spaced elements for retaining the ends of the tire spaced apart when the wire therein is tensioned, said spaced elements having a groove for receiving the ends of the wire projecting from the ends of the tire which are in crossed relation in the space between said spaced elements, means for moving the forward end of said levers away from each other for applying a tension to the wire when the ends are secured to the levers, and means for revolving the wheel and tire to form a loop in the wire at the point where the ends are crossed.

8. In a device for applying a solid tire containing a central wire to the peripheral groove of a wheel which comprises a standard having a top supporting element, a pair of tubular levers pivoted on said element, cylinders secured to the rear end of said tubular levers, a piston in each of said cylinders, a rod extending from said pistons through the hollow interior of said levers to the forward end adjacent to a notch provided therein in which the ends of the wire in the tire may be disposed and clamped when the pistons are moved forwardly in the cylinders, a rotatable element secured to said supporting element having a pair of spaced elements for retaining the ends of the tire spaced apart when the wire therein is tensioned, said spaced elements having a groove for receiving the ends of the wire projecting from the ends of the tire which are in crossed relation in the space between said spaced elements, means for moving the forward end of said levers away from each other for applying a tension to the wire when the ends are secured to the levers, means for revolving the wheel and tire to form a loop in the wire at the point where the ends are crossed, and means for compressing the loop and cutting the ends from the wire.

9. In a machine for applying a solid tire containing a central wire to the groove in a wheel which includes, in combination, a base support, a pair of levers secured to said support, fluid actuated clamping means for the ends of the wire, fluid means for moving the ends of the levers in which the ends of the wires are clamped away from each other, rotatable means for supporting the wheel and tire, and fluid means for rotating said wheel and tire supporting means.

10. In a machine for applying a solid tire containing a central wire to the groove in a wheel which includes, in combination, a base support, a pair of levers secured to said support, fluid actuated clamping means for the ends of the wire, fluid means for moving the ends of the levers in which the ends of the wires are clamped away from each other, rotatable means for supporting the wheel and tire, fluid means for rotating said wheel and tire supporting means, and a fluid circuit comprising a plurality of valves for admitting fluid to the clamping cylinders for the wire, to the fluid means for moving the levers to tension the wire, and to the fluid means for rotating the wheel and wire to form a loop therein.

11. In a machine for applying a solid tire containing a central wire to the groove in a wheel which includes, in combination, a base support, a pair of levers secured to said support, fluid actuated clamping means for the ends of the wire, fluid means for moving the ends of the levers in which the ends of the wires are clamped away from each other, rotatable means for supporting the wheel and tire, fluid means for rotating said wheel and tire supporting means, a fluid circuit comprising a plurality of valves for admitting fluid to the clamping cylinders for the wire to the fluid means for moving the levers to tension the wire, and to the fluid means for rotating the wheel and wire to form a loop therein, and loop completing and end cutting means for severing the ends of the wire and for compressing the loop.

12. In a machine for applying a solid tire containing a central wire to a groove in the periphery of a wheel which includes, in combination, a base support, a pair of levers secured to said support, fluid actuated clamping means for the ends of the wire on said levers, fluid means for moving the ends of the levers to which the ends of the wires are clamped away from each other to tension said wires, rotatable means for supporting the wheel and tire, fluid means for rotating said wheel and tire supporting means for twisting said wires about each other, a cutting bar disposed in a position to sever the ends of the wire above the loop, a fluid cylinder for operating said cutting bar to cut said wires and to deflect the wires to complete the loop, and a fluid circuit comprising a plurality of valves for admitting fluid to the clamping cylinders for the wire, to the fluid means for moving the levers to tension the wire, to the fluid means for rotating the wheel and wire to form a loop therein, and to the fluid means for actuating said cutting bar for severing and completing the loop.

13. In a machine for applying a solid tire containing a central wire to a groove in the periphery of a wheel which includes, in combination, a base support, a pair of levers secured to said support, fluid actuated clamping means for the ends of the wire on said levers, fluid means for moving the ends of the levers to which the ends of the wires are clamped away from each other to tension said wires, rotatable means for supporting the wheel and tire, fluid means for rotating said wheel and tire supporting means for twisting said wires about each other, a cutting bar disposed in a position to sever the ends of the wire above the loop, and resilient bumpers aligned with said levers against which they engage when the wires are severed.

14. In a machine for applying a solid tire containing a central wire to a groove in the periphery of a wheel which includes, in combination, a base support, a pair of levers secured to said support, fluid actuated clamping means for the ends of the wire on said levers, fluid means for moving the ends of the levers to which the ends of the wires are clamped away from each other to tension said wires, rotatable means for supporting the wheel and tire, fluid means for rotating said wheel and tire supporting means for twisting said wires about each other, a cutting bar disposed in a position to sever the ends of the wire above the loop, a fluid cylinder for operating said cutting bar to cut said wires and to deflect the wires to complete the loop, a fluid circuit comprising a plurality of valves for admitting fluid to the clamping cylinders for the wire, to the fluid means for moving the levers to tension the wire, to the fluid means for rotating the wheel and wire to form a loop therein, and to the fluid means for actuating said cutting bar for severing and completing the loop, and means thereafter for retracting the cutting bar returning the supporting means for the wheel and tire, for retracting the levers which tension the wire and for thereafter releasing the clamping means for the wires to have all of the elements of the machine in position for the next succeeding cycle of operation.

15. A device for applying a tire to the peripheral groove of a wheel, said tire having a wire extending therethrough with the ends extending therefrom, including, in combination, means on said machine for engaging said ends and applying a tension to said wire with the ends in crossed relation to draw the tire into the groove of said wheel, means on said machine for spacing the ends of the tire from each other when tension is applied to the wire, and means on said machine for rotating said spacing means, said wheel and tire in unison relative to said wire end engaging means to apply a twist to said wire at the point of crossing.

16. A device for applying a tire to the peripheral groove of a wheel, said tire having a wire extending therethrough with the ends extending therefrom, including, in combination, wire gripping means on said machine movable toward and away from each other, rotatable supporting means on said machine for said wheel having tire spacing elements thereon, means for relatively moving said gripping means away from each other after the wire ends have been gripped thereby with the wires in crossed relation and the tire disposed in the groove of the wheel, and means on said machine for rotating said supporting means, said elements and tire relative to said engaging means for the wire to form a loop at the crossed portion of the wire ends.

PAUL D. MIZE.

REFERENCES CITED

The following references are of record in the file of this patent:

UNITED STATES PATENTS

| Number | Name | Date |
|---|---|---|
| 299,033 | Stevens | May 20, 1884 |
| 529,258 | Gardner et al. | Nov. 13, 1894 |
| 658,712 | Grant | Sept. 25, 1900 |
| 672,104 | Palmer | Apr. 16, 1901 |
| 676,452 | Toole | June 18, 1901 |
| 789,464 | Tragler et al. | May 9, 1905 |
| 905,671 | Edmisten | Dec. 1, 1908 |
| 929,617 | Maynard | July 27, 1909 |
| 1,656,606 | Pierce | Jan. 17, 1928 |

FOREIGN PATENTS

| Number | Country | Date |
|---|---|---|
| 378,755 | Germany | July 31, 1923 |